United States Patent
Woo et al.

(10) Patent No.: US 9,694,687 B2
(45) Date of Patent: Jul. 4, 2017

(54) METHOD AND APPARATUS FOR DISPLAYING FUEL EFFICIENCY INCREASING RATE DURING ECO-COASTING FOR ELECTRIC VEHICLE

(71) Applicant: Hyundai Motor Company, Seoul (KR)

(72) Inventors: Jeong-Yeop Woo, Incheon (KR); Jae-Seok You, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/943,233

(22) Filed: Nov. 17, 2015

(65) Prior Publication Data

US 2017/0080806 A1 Mar. 23, 2017

(30) Foreign Application Priority Data

Sep. 21, 2015 (KR) .......... 10-2015-0133069

(51) Int. Cl.
| | | |
|---|---|---|
| *B60L 3/12* | (2006.01) | |
| *B60W 50/14* | (2012.01) | |
| *B60W 50/00* | (2006.01) | |
| *B60L 15/20* | (2006.01) | |

(52) U.S. Cl.
CPC ............ *B60L 3/12* (2013.01); *B60L 15/2045* (2013.01); *B60W 50/0097* (2013.01); *B60W 50/14* (2013.01); *B60L 2250/16* (2013.01); *B60L 2260/24* (2013.01); *B60L 2260/26* (2013.01); *B60W 2050/146* (2013.01); *B60W 2550/142* (2013.01)

(58) Field of Classification Search
None
See application file for complete search history.

(56) References Cited

U.S. PATENT DOCUMENTS

| | | | | |
|---|---|---|---|---|
| 7,454,962 B2 * | 11/2008 | Nishiyama | ................ | G01F 9/02 |
| | | | | 73/114.52 |
| 8,116,971 B2 * | 2/2012 | Chen | ................ | G01C 21/3469 |
| | | | | 340/439 |
| 9,026,348 B2 * | 5/2015 | Ichinokawa | .......... | B60W 50/14 |
| | | | | 701/123 |
| 2007/0143002 A1 * | 6/2007 | Crowell | ................ | G07C 5/004 |
| | | | | 701/123 |

FOREIGN PATENT DOCUMENTS

| | | |
|---|---|---|
| JP | 2008-157081 A | 7/2008 |
| JP | 2009-250930 A | 10/2009 |
| JP | 2010-038754 A | 2/2010 |
| JP | 2011-183020 A | 9/2011 |
| JP | 2012-197069 A | 10/2012 |
| KR | 2011-0054984 A | 5/2011 |
| KR | 2013-0106524 A | 9/2013 |

* cited by examiner

*Primary Examiner* — Redhwan k Mawari
*Assistant Examiner* — Edward Torchinsky
(74) *Attorney, Agent, or Firm* — Mintz Levin Cohn Ferris Glovsky and Popeo, P.C.; Peter F. Corless

(57) ABSTRACT

The present disclosure relates to a method and an apparatus for displaying a fuel efficiency increasing rate during eco-coasting for an electric vehicle. According to embodiments of the present disclosure, a driver may confirm the fuel efficiency increasing rate depending on the eco-coasting performance after driving ends to lead a driver to use an eco-coasting guide function and perform fuel efficiency driving.

8 Claims, 6 Drawing Sheets

FIG.5

| ENDING SPEED (kph) \ STARTING SPEED (kph) | 150 | 140 | 130 | 120 | 110 | 100 | 90 | 80 | 70 | 60 | 50 | 40 | 30 | 20 | 10 | 0 |
|---|---|---|---|---|---|---|---|---|---|---|---|---|---|---|---|---|
| 0 | -0.2 | -0.19 | ... | ... | ... | ... | ... | ... | ... | ... | ... | ... | ... | -0.01 | | 0 |
| 10 | -0.19 | ... | ... | ... | ... | ... | ... | ... | ... | ... | ... | ... | ... | -0.005 | -0.005 | 0 |
| 20 | -0.18 | ... | ... | ... | ... | ... | ... | ... | ... | ... | ... | ... | ... | 0 | 0 | 0 |
| ... | ... | ... | ... | ... | ... | ... | ... | ... | ... | ... | ... | ... | ... | ... | ... | ... |
| 130 | -0.01 | | 0 | 0 | 0 | 0 | 0 | 0 | 0 | 0 | 0 | 0 | 0 | 0 | 0 | 0 |
| 140 | -0.005 | 0 | 0 | 0 | 0 | 0 | 0 | 0 | 0 | 0 | 0 | 0 | 0 | 0 | 0 | 0 |
| 150 | 0 | 0 | 0 | 0 | 0 | 0 | 0 | 0 | 0 | 0 | 0 | 0 | 0 | 0 | 0 | 0 |

METHOD AND APPARATUS FOR DISPLAYING FUEL EFFICIENCY INCREASING RATE DURING ECO-COASTING FOR ELECTRIC VEHICLE

CROSS-REFERENCE TO RELATED APPLICATION

This application claims the benefit of and priority to Korean Patent Application No. 10-2015-0133069, filed on Sep. 21, 2015, which is incorporated herein by reference in its entirety.

BACKGROUND OF THE DISCLOSURE

Technical Field

Embodiments of the present disclosure relate generally to a method and an apparatus for displaying a fuel efficiency increasing rate during eco-coasting for an electric vehicle, and more particularly, to a method and an apparatus for displaying a fuel efficiency increasing rate during eco-coasting for an electric vehicle when a driver of the electric vehicle performs the eco-coasting depending on an eco-coasting guide function.

Description of Related Art

To meet increasingly tightened exhaust gas regulations for vehicles and to improve fuel efficiency, various eco-friendly vehicles have been developed. Among these eco-friendly vehicles, many electric vehicles (EV) to which a motor as a power source is applied have been developed.

Existing electric vehicles have an eco-coasting guide function embedded therein to guide coasting (i.e., "eco-coasting") and improve fuel efficiency. The eco-coasting guide function is a function of guiding an optimal coasting starting point (i.e., the optimal point at which the eco-coasting starts without operating an accelerator pedal and a brake pedal) to a driver, when there is a need to decelerate a vehicle speed in consideration of road conditions in front of a vehicle while driving.

However, the eco-coasting guide function is a simple guide function and therefore may not improve fuel efficiency if the driver does not follow it. Further, it may not be understood how much the fuel efficiency is improved when the eco-coasting is performed depending on the eco-coasting guide function, compared to when the eco-coasting guide function is not performed. Therefore, the eco-coasting guide function may not lead a driver to correctly perform the eco-coasting.

SUMMARY OF THE DISCLOSURE

An embodiment of the present disclosure is directed to leading a driver to use an eco-coasting guide function and perform fuel efficiency driving (i.e., eco-coasting), by displaying a fuel efficiency increasing rate when the eco-coasting is performed depending on an eco-coasting guide function.

Other objects and advantages of the present disclosure can be understood by the following description, and become apparent with reference to the embodiments of the present disclosure. Also, it is apparent to those skilled in the art to which the present disclosure pertains that the objects and advantages of the present disclosure can be realized by the means as claimed and combinations thereof.

In accordance with embodiments of the present disclosure, a method for displaying a fuel efficiency increasing rate during eco-coasting for an electric vehicle, includes: determining whether a driver of the vehicle performs an eco-coasting guide function; determining whether the driver inputs a destination and selects a driving route to the destination when the eco-coasting guide function is performed; accumulating energy consumption in each eco-coasting performance section in which the driver performs the eco-coasting guide function while driving to calculate a total energy consumption in all eco-coasting performance sections while driving when the driver inputs the destination and selects the driving route; summing energy gain rates to calculate a total energy gain rate while driving when the eco-coasting guide function is performed, compared to when the eco-coasting guide function is not performed, in each of the eco-coasting performance sections, simultaneously with calculating the total energy consumption; calculating the fuel efficiency increasing rate when the eco-coasting guide function is performed, compared to when the eco-coasting is not performed, while the driving ends; and displaying the calculated fuel efficiency increasing rate.

When calculating the total energy consumption, a product of a current of a battery of the vehicle and a voltage of the battery in each of the eco-coasting performance sections may be integrated with respect to time to calculate energy consumption in each of the eco-coasting performance sections according to the following Equation, and the calculated energy consumption may be accumulated to calculate the total energy consumption.

$$\text{Energy Consumption (kWh)} = \int \frac{|\text{Battery current }(A) \times \text{battery voltage }(V)|}{1000} dt$$

When the summing of the energy gain rates, the energy gain rates in each of the eco-coasting performance sections calculated according to a pre-stored speed-energy gain rate map may be summed to calculate the total energy gain rate by the eco-coasting guide function performance while driving.

When a starting speed of the vehicle and an ending speed of the vehicle are equal to each other, the speed-energy gain rate map may display an energy gain rate when the eco-coasting guide function is performed, compared to when the eco-coasting is not performed, at the same moving distance.

The starting speed, the ending speed, the moving distance, the energy consumption, and the vehicle speed may be measured for each eco-coasting performance section, when the eco-coasting is not performed at the same starting speed, ending speed, and moving distance as the measured starting speed, ending speed, and moving distance in the eco-coasting performance section, energy consumption and a vehicle speed may be measured, and a difference between the energy consumption in the eco-coasting performance section and the energy consumption when the eco-coasting guide function is not performed may be calculated as the energy gain rate at the starting speed and the ending speed, thereby acquiring the speed-energy gain rate map.

When calculating the fuel efficiency increasing rate, the fuel efficiency increasing rate may be calculated according to the following Equation.

Fuel efficiency increasing rate (%) =

$$\left[ \frac{\text{Total of energy gain rate}\left(\frac{\text{kWh}}{\text{km}}\right)}{\text{Total of energy consumption when}} \right] \times 100$$
$$\text{eco-coasting is performed}\left(\frac{\text{kWh}}{\text{km}}\right)$$

Furthermore, according to embodiments of the present disclosure, an apparatus for displaying a fuel efficiency increasing rate during eco-coasting for an electric vehicle includes: a storage medium in which program instructions for performing a method for displaying the fuel efficiency increasing rate during eco-coasting for the electric vehicle and a speed-energy gain rate map are stored; an input unit configured to input whether an eco-coasting guide function is performed, a destination, and a driving route to the destination; a controller configured to calculate the fuel efficiency increasing rate according to the speed-energy gain rate map and the program instructions for performing the method for displaying the fuel efficiency increasing rate during eco-coasting for the electric vehicle, based on information input by the input unit; and an output unit configured to display the calculated fuel efficiency increasing rate controller.

The output unit may be a cluster.

BRIEF DESCRIPTION OF THE DRAWINGS

FIG. 5 is a diagram illustrating the speed-energy gain rate map depending on the measurement method illustrated in FIGS. 3 and 4.

DETAILED DESCRIPTION OF EMBODIMENTS

Figure 1:
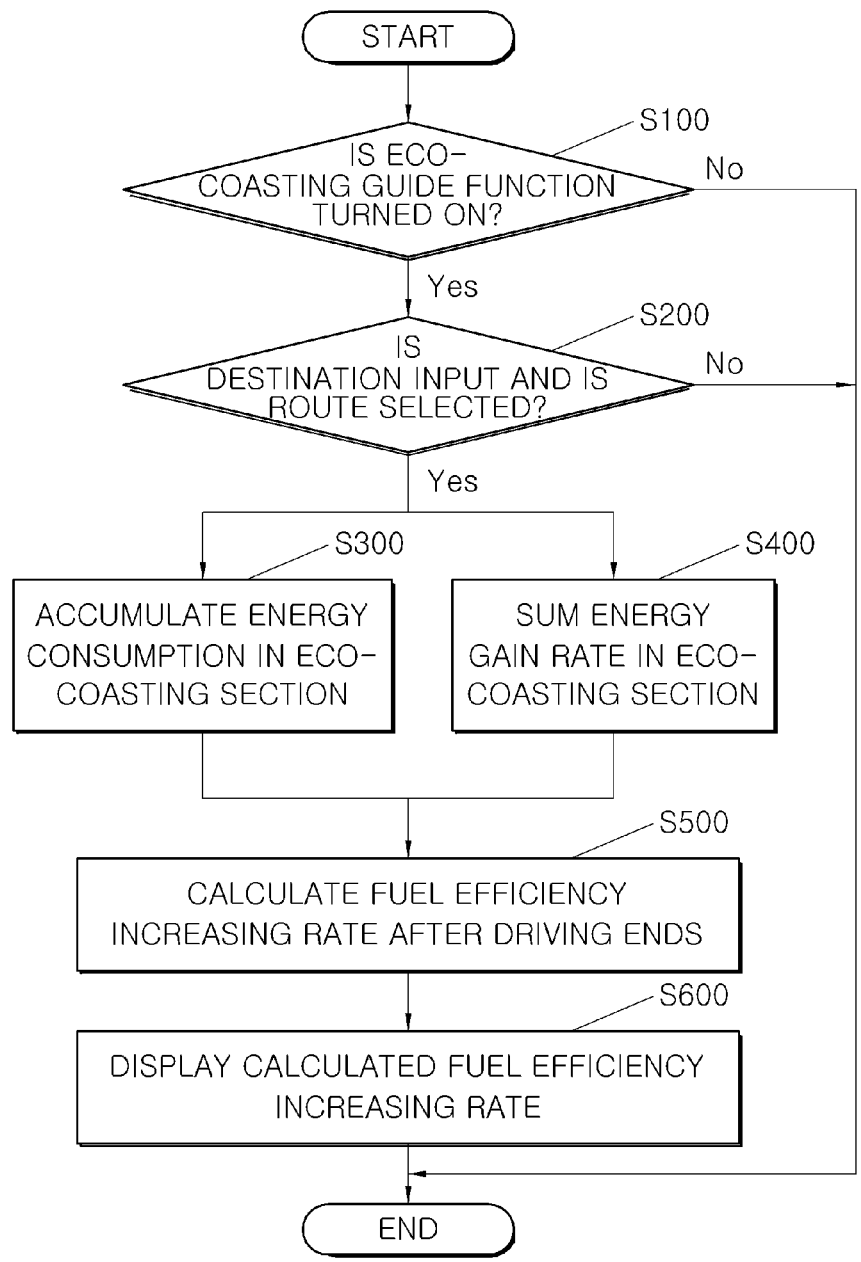
FIG. 1 is a flow chart of a method for displaying a fuel efficiency increasing rate during eco-coasting for an electric vehicle according to embodiments of the present disclosure.

Terms and words used in the present specification and claims are not to be construed as a general or dictionary meaning but are to be construed meaning and concepts meeting the technical ideas of the present disclosure based on a principle that the inventors can appropriately define the concepts of terms in order to describe their own disclosures in best mode. Therefore, the configurations described in the exemplary embodiments and drawings of the present disclosure are merely most preferable embodiments but do not represent all of the technical spirit of the present disclosure.

Thus, the present disclosure should be construed as including all the changes, equivalents, and substitutions included in the spirit and scope of the present disclosure at the time of filing this application. In the present specification, an overlapped description and a detailed description for well-known functions and configurations that may obscure the gist of the present disclosure will be omitted.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Hereinafter, embodiments of the present disclosure will be described in detail with reference to the accompanying drawings.

FIG. 1 is a flow chart of a method for displaying a fuel efficiency increasing rate during eco-coasting for an electric vehicle according to embodiments of the present disclosure. As shown in FIG. 1, a method for displaying a fuel efficiency increasing rate during eco-coasting for an electric vehicle according to embodiments of the present disclosure includes: determining whether a driver performs (or operates) an eco-coasting guide function (S100); determining whether the driver inputs a destination to select a driving route, when the eco-coasting guide function is operated (S200); accumulating energy consumption in each section (hereinafter referred to as "eco-coasting performance sections") in which the driver performs the eco-coasting while driving to calculate a total of energy consumption in all the eco-coasting performance sections while driving, when the driver inputs the destination and selects the driving route (S300); summing energy gain rates to calculate a total of energy gain rate while driving when the eco-coasting is performed, compared to when the eco-coasting is not performed (i.e., when a brake is used) in each of the eco-coasting performance sections (S400), simultaneously with calculating the total of energy consumption (S300); calculating the fuel efficiency increasing rate when the eco-coasting is performed, compared to when the eco-coasting is not performed (i.e., when the brake is used), while the driving ends (S500); and displaying the calculated fuel efficiency increasing rate (S600).

In the determining whether the driver operates the eco-coasting guide function (S100), the eco-coasting guide function is a function of guiding an optimal coasting (i.e., eco-coasting) starting point to the driver, when there is a need to decelerate a vehicle speed in consideration of road conditions in front of a vehicle while driving. For example, when there is a need to decelerate a vehicle speed in the case in which there is a sharp curve in front of the vehicle which is driving, there is a tollgate, there is a speed camera, etc., the eco-coasting guide function leads the driver to perform the coasting at the optimal coasting point so as to pass through the above-mentioned deceleration factors without operating the brake. Therefore, when the driver does not operate the eco-coasting guide function, the method for displaying a fuel efficiency increasing rate during eco-coasting for an electric vehicle ends.

The determining whether the driver inputs a destination to select a driving route (S200) is a step of allowing the driver to figure out the destination and the driving route to perform the above-mentioned eco-coasting guide function. Therefore, when the driver does not input the destination or does not select the driving route, the method for displaying a fuel efficiency increasing rate during eco-coasting for an electric vehicle ends.

In the calculating of the total of energy consumption (S300), a product of a current of a battery and a voltage of the battery in each of the eco-coasting performance section is integrated with respect to time to calculate energy consumption in each of the eco-coasting performance section and the calculated energy consumption is accumulated to calculate a total of energy consumption. The energy consumption is calculated according to the following Equation 1.

$$\text{Energy Consumption (kWh)} = \int \frac{|\text{Battery current }(A) \times \text{battery voltage }(V)|}{1000} dt \quad \text{[Equation 1]}$$

In the summing (S400), the energy gain rates in each of the eco-coasting performance section calculated depending on a pre-stored speed-energy gain rate map are summed to calculate a total of energy gain rate by the eco-coasting performance while driving. When a starting speed and an ending speed are equal to each other, the speed-energy gain rate map displays an energy gain rate when the eco-coasting is performed, compared to when the eco-coasting is not performed (i.e., when the brake is used) at the same moving distance.

That is, each of the moving distances, the energy consumption, and the vehicle speeds depending on starting speeds and ending speeds of the eco-coasting performance sections is measured, when the brake having the same starting speeds, ending speeds, and moving distances as the measured starting speeds, ending speeds, and moving distances in each of the eco-coasting performance sections is operated, the energy consumption and the vehicle speed are measured, and a difference between the energy consumption when the eco-coasting performance section is performed and the energy consumption when the brake is operated is calculated as the energy gain rate at the starting speed and the ending speed, thereby acquiring the speed-energy gain rate map.

Figure 2:
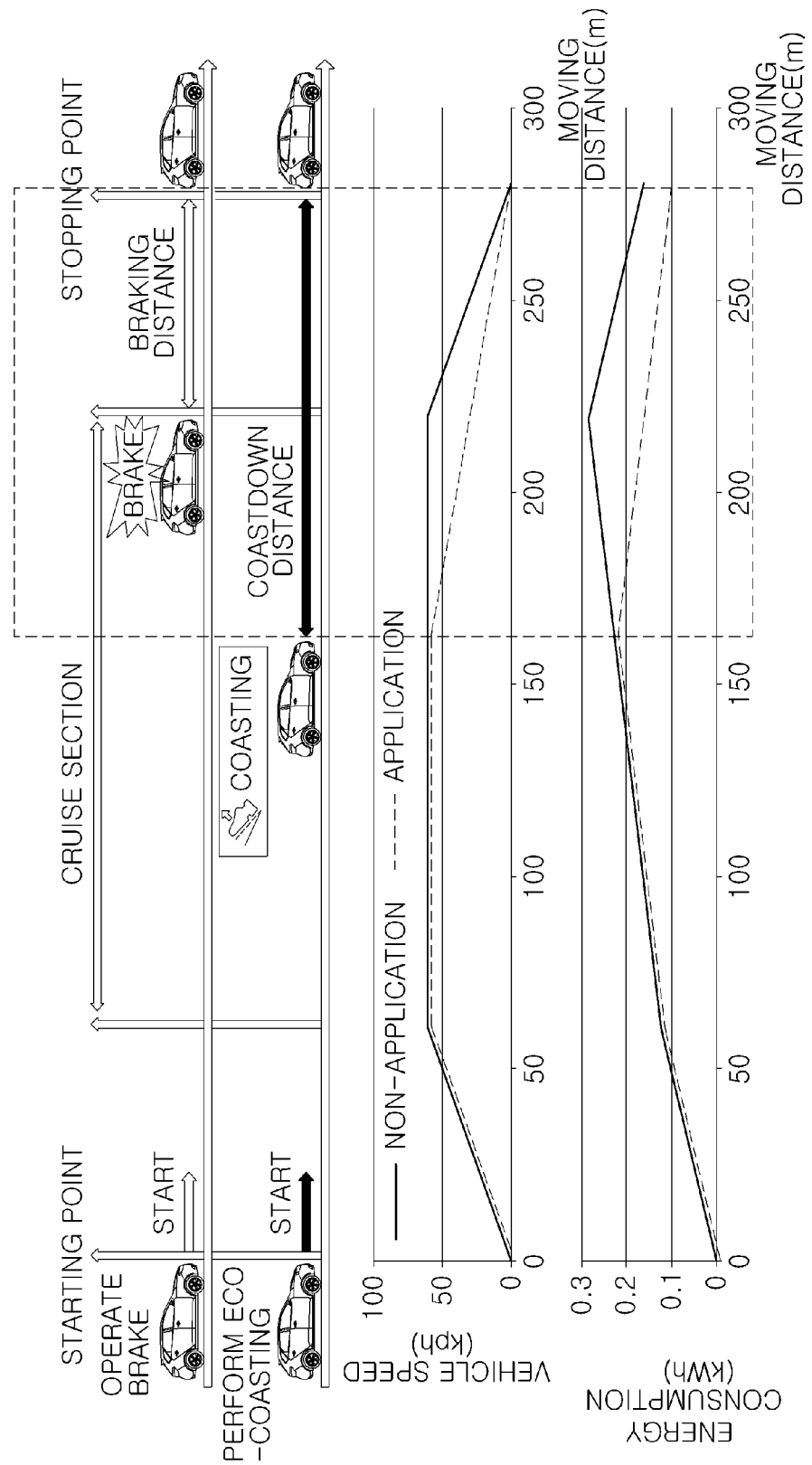
FIG. 2 is a diagram for describing a concept of the method for displaying a fuel efficiency increasing rate during eco-coasting for an electric vehicle according to embodiments of the present disclosure.
Figure 3:
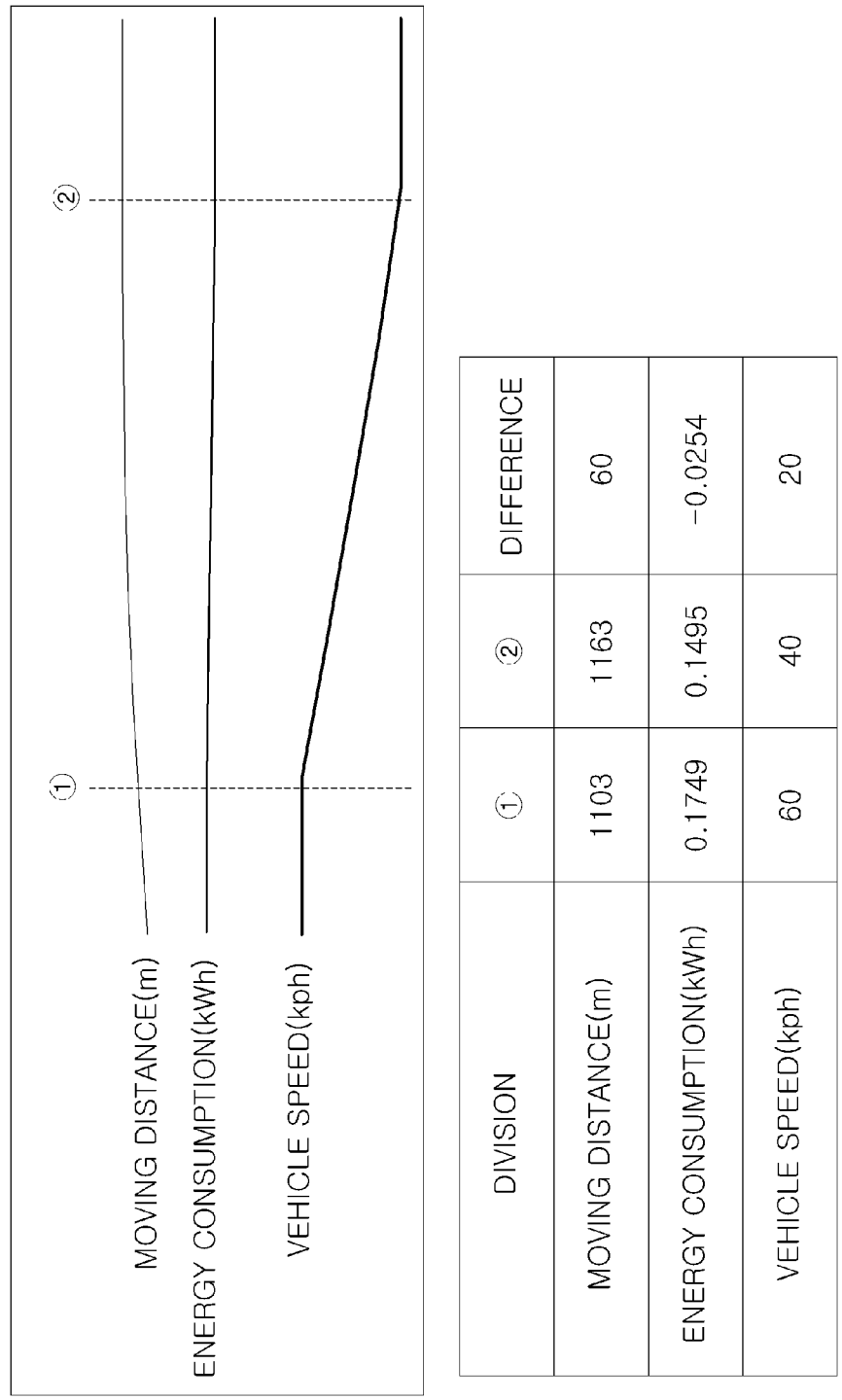
FIG. 3 is a diagram illustrating a measurement of a moving distance (m), energy consumption (kWh), and a vehicle speed (kph) when a starting speed is 60 kph and an ending speed is 40 kph during the eco-coasting.
Figure 4:
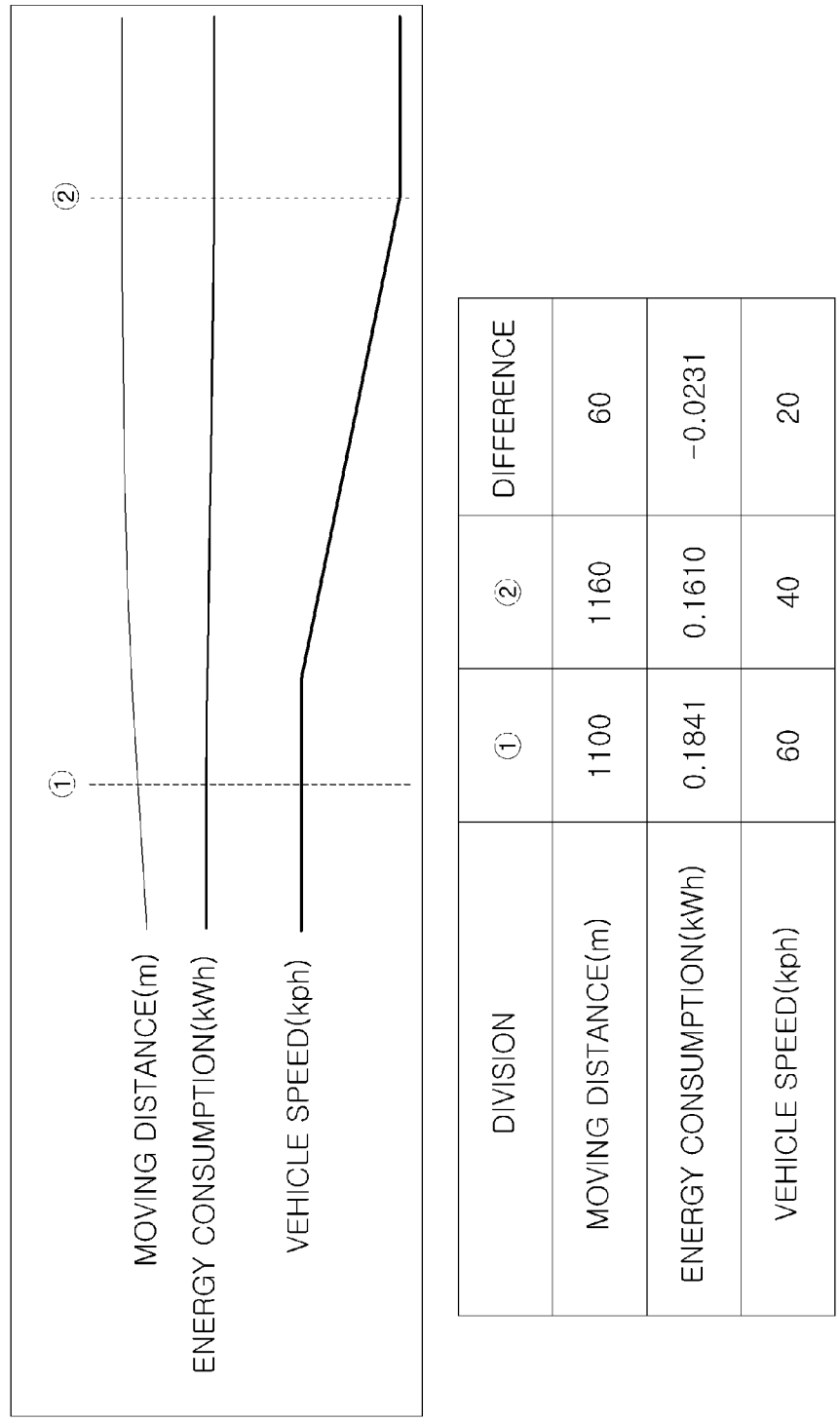
FIG. 4 is a diagram illustrating the measurement of the energy consumption (kWh) and the vehicle speed (kph) at the time of the same distance movement as FIG. 4 when the starting speed is 60 kph, the ending speed is 40 kph, and a deceleration is 0.15 g due to an operation of a brake.

Hereinafter, a method for calculating a pre-stored speed-energy gain rate map will be described in detail. FIG. 2 is a diagram for describing a concept of the method for displaying a fuel efficiency increasing rate during eco-coasting for an electric vehicle according to embodiments of the present disclosure. FIG. 3 is a diagram illustrating a measurement of a moving distance (m), energy consumption (kWh), and a vehicle speed (kph) when a starting speed is 60 kph and an ending speed is 40 kph during the eco-coasting and FIG. 4 is a diagram illustrating the measurement of the energy consumption (kWh) and the vehicle speed (kph) at the time of the same distance movement as FIG. 4 when the starting speed is 60 kph, the ending speed is 40 kph, and a deceleration is 0.15 g due to the operation of the brake. Here, g is a gravitational acceleration of 9.8 m/s². Further, it is assumed that the vehicle is driving at a constant speed before being decelerated. Further, FIG. 5 is a diagram illustrating the speed-energy gain rate map depending on the measurement method illustrated in FIGS. 3 and 4.

In FIG. 3, when the starting speed is 60 kph in the eco coasting performance section and the ending speed is 40 kph, the difference between the moving distances is 60 m and the difference between the energy consumption is −0.0254 kWh. Further, in FIG. 4, when the starting speed is 60 kph, the ending speed is 40 kph, and the deceleration is 0.15 g due to the operation of the brake, the difference between the energy consumption at 60 m which is the difference between the same moving distances is −0.0231 kWh. Therefore, when the starting speed is 60 kph and the ending speed is 40 kph, the energy gain rate is −0.0023 kWh which is a difference between −0.0254 kWh and −0.0231 kWh.

FIG. 5 is a diagram illustrating the pre-stored speed-energy gain rate map. It is possible to obtain the pre-stored speed-energy gain rate map for each starting speed and ending speed by using the measurement method of FIGS. 3 and 4. In this case, the coasting (i.e., eco-coasting) section is a deceleration section, such that the ending speed may not be larger than the starting speed. Therefore, 0 is input to all the sections in which the ending speed is larger than the starting speed.

In the calculating of the fuel efficiency increasing rate (S500), a ratio of the difference between the fuel efficiency when the eco-coasting is performed to the fuel efficiency when the brake is operated and the fuel efficiency when the brake is operated is calculated. The fuel efficiency increasing rate based on the eco-coasting is calculated according to the following Equation 2.

$$\text{Fuel efficiency increasing rate (\%)} = \quad \text{[Equation 2]}$$

$$\left( \frac{\text{Fuel efficiency when eco-coasting is performed}\left(\frac{km}{kWh}\right)}{\text{Fuel efficiency when brake is operated}\left(\frac{km}{kWh}\right)} - 1 \right) \times 100 =$$

$$\left( \frac{\text{Total of energy consumption when brake is operated}\left(\frac{kWh}{km}\right)}{\text{Total of energy consumption when eco-coasting is performed}\left(\frac{kWh}{km}\right)} - 1 \right) \times 100 =$$

$$\left[\frac{\text{Total of energy gain rate}\left(\frac{\text{kWh}}{\text{km}}\right)}{\text{Total of energy consumption when}}\right] \times 100$$
$$\text{eco-coasting is performed}\left(\frac{\text{kWh}}{\text{km}}\right)$$

Hereinafter, the calculating of the fuel efficiency increasing rate (S500) will be described for example. It is assumed that the driver operates the eco-coasting guide function, inputs the destination, and selects the driving route. It is assumed that the eco-coasting performance section while driving the electric vehicle in which the driver gets is generated three times and the driver performs the eco-coasting three times depending on the guide.

In this case, it is assumed that in the first eco-coasting performance section, the starting speed is 60 kph, the ending speed is 40 kph, and the energy gain rate is −0.043 kWh and in the second eco-coasting performance section, the starting speed is 50 kph, the ending speed is 30 kph, and the energy gain rate is −0.043 kWh. Further, it is assumed that a total sum of energy consumption in the eco-coasting performance section which is calculated according to the above Equation 1 is 6.4783 kWh.

As described above, a total of energy gain rate is −0.136 kWh. Therefore, according to the above Equation 2, the fuel efficiency increasing rate in the eco-coasting performance section is −0.136 kWh/6.4783 kWh×100 and therefore is calculated as −2.10%. That is, the fuel efficiency when the eco-coasting is performed in the eco-coasting performance section is 2.10% higher than that when the brake is operated.

In the displaying of the calculated fuel efficiency increasing rate (S600), the fuel efficiency increasing rate calculated as described above is displayed to the driver to allow the driver to recognize the fuel efficiency increasing rate and to follow the eco-coasting guide faithfully.

Figure 6:
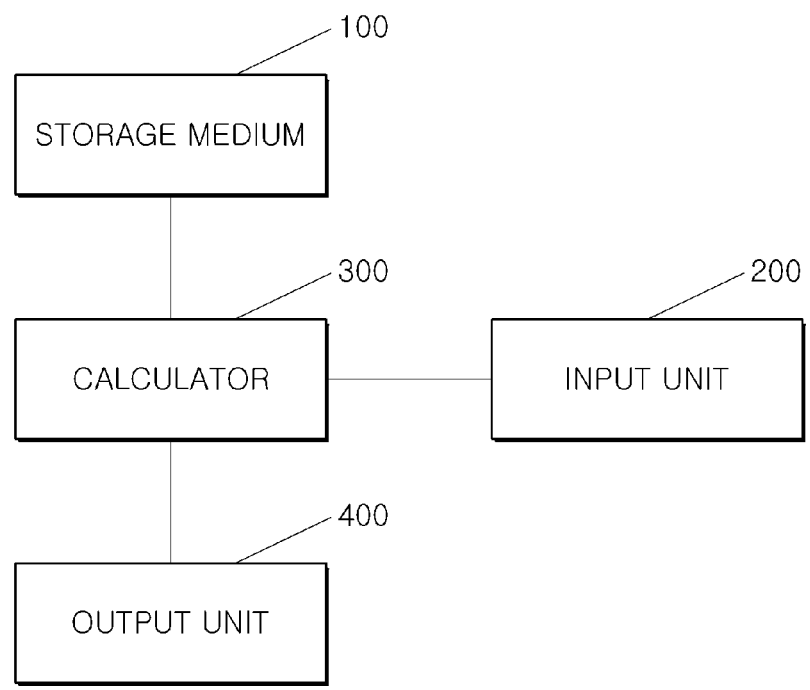
FIG. 6 is a block diagram illustrating an apparatus for displaying a fuel efficiency increasing rate during eco-coasting for an electric vehicle according to embodiments of the present disclosure.

Additionally, FIG. 6 is a block diagram illustrating an apparatus for displaying a fuel efficiency increasing rate during eco-coasting for an electric vehicle according to embodiments of the present disclosure. As shown in FIG. 6, an apparatus for displaying a fuel efficiency increasing rate during eco-coasting for an electric vehicle according to embodiments of the present disclosure includes: a storage medium 100 in which program instructions for performing the method for displaying a fuel efficiency increasing rate during eco-coasting for an electric vehicle and the speed-energy gain rate map are stored; an input unit 200 configured to input whether an eco-coasting guide function is operated, a destination, and a driving route; a controller 300 configured to calculate the fuel efficiency increasing rate depending on the speed-energy gain rate map stored in the storage medium 100 and the method for displaying a fuel efficiency increasing rate during eco-coasting for an electric vehicle, based on information input by the input unit 200; and an output unit 400 configured to display the calculated fuel efficiency increasing rate. Further, the output unit 400 may be a cluster.

As described above, according to embodiments of the present disclosure, the driver may confirm the fuel efficiency increasing rate depending on the eco-coasting performance after the driving ends to lead the driver to use the eco-coasting guide function and perform the fuel efficiency driving (i.e., eco-coasting).

The foregoing embodiments are only examples to allow a person having ordinary skill in the art to which the merely disclosure pertains (hereinafter, referred to as those skilled in the art) to easily practice the present disclosure. Accordingly, the present disclosure is not limited to the foregoing embodiments and the accompanying drawings, and therefore, a scope of the present disclosure is not limited to the foregoing embodiments. Accordingly, it will be apparent to those skilled in the art that substitutions, modifications and variations can be made without departing from the spirit and scope of the disclosure as defined by the appended claims and can also belong to the scope of the disclosure.

What is claimed is:

1. A method for displaying a fuel efficiency increasing rate during eco-coasting for an electric vehicle, the method comprising:
providing, by a controller equipped in the vehicle, eco-coasting guidance by informing a driver of the vehicle of an optimal coasting point at which controlling the vehicle without operation of a brake or accelerator pedal will cause the vehicle to decelerate to a desired speed upon a given location;
determining, by the controller, whether the driver of the vehicle adheres to the eco-coasting guidance based on whether the vehicle is controlled in accordance with the optimal coasting point;
receiving, by an input unit equipped in the vehicle, a destination and a driving route to the destination;
calculating, by the controller, a total energy consumption across a plurality of eco-coasting performance sections, in which the driver adheres to the eco-coasting guidance while driving along the driving route, based on a current of a battery of the vehicle and a voltage of the battery in each eco-coasting performance section;
summing, by the controller, energy gain rates to calculate a total energy gain rate while driving along the driving route when the driver adheres to the eco-coasting guidance, compared to when the driver does not adhere to the eco-coasting guidance, in each of the eco-coasting performance sections, simultaneously with calculating the total energy consumption;
calculating, by the controller, the fuel efficiency increasing rate when the driver adheres to the eco-coasting guidance, compared to when the driver does not adhere to the eco-coasting guidance, based on the calculated total energy gain rate; and
displaying, by an output unit equipped in the vehicle, the calculated fuel efficiency increasing rate.

2. The method of claim 1, wherein when calculating the total energy consumption, a product of the current of the battery and the voltage of the battery in each of the plurality of eco-coasting performance sections is integrated with respect to time to calculate energy consumption in each eco-coasting performance section according to the following Equation, and the calculated energy consumption is accumulated to calculate the total energy consumption.

$$\text{Energy Consumption (kWh)} = \int \frac{|\text{Battery current }(A) \times \text{battery voltage}(V)|}{1000} dt.$$

3. The method of claim 1, wherein when the summing of the energy gain rates, the energy gain rates in each of the plurality of eco-coasting performance sections calculated according to a pre-stored speed-energy gain rate map are summed to calculate the total energy gain rate by adhering to the eco-coasting guidance while driving.

4. The method of claim 3, wherein when a starting speed of the vehicle and an ending speed of the vehicle are equal to each other, the speed-energy gain rate map displays an energy gain rate when the driver adheres to the eco-coasting guidance, compared to when the driver does not adhere to the eco-coasting guidance, at the same moving distance.

5. The method of claim 4, wherein:
the starting speed, the ending speed, the moving distance, the energy consumption, and the vehicle speed are measured for each eco-coasting performance section,
when the driver does not adhere to the eco-coasting guidance at the same starting speed, ending speed, and moving distance as the measured starting speed, ending speed, and moving distance in the eco-coasting performance section, energy consumption and a vehicle speed are measured, and
a difference between the energy consumption in the eco-coasting performance section and the energy consumption when the driver does not adhere to the eco-coasting guidance is calculated as the energy gain rate at the starting speed and the ending speed, to acquire the speed-energy gain rate map.

6. The method of claim 1, wherein when calculating the fuel efficiency increasing rate, the fuel efficiency increasing rate is calculated according to the following Equation.

$$\text{Fuel efficiency increasing rate } (\%) = \left( \frac{\text{Total of energy gain rate}\left(\frac{kWh}{km}\right)}{\text{Total of energy consumption when eco-coasting is performed}\left(\frac{kWh}{km}\right)} \right) \times 100.$$

7. An apparatus for displaying a fuel efficiency increasing rate during eco-coasting for an electric vehicle, the apparatus comprising:
a storage medium in which program instructions for performing a method for displaying the fuel efficiency increasing rate during eco-coasting for the electric vehicle and a speed-energy gain rate map are stored;
an input unit equipped in the vehicle through which a destination and a driving route to the destination are received from a driver of the vehicle;
a controller configured to execute the stored program instructions, which when executed cause the controller to:
provide eco-coasting guidance by informing a driver of the vehicle of an optimal coasting point at which controlling the vehicle without operation of a brake or accelerator pedal will cause the vehicle to decelerate to a desired speed upon a given location,
determine whether the driver of the vehicle adheres to the eco-coasting guidance based on whether the vehicle is controlled in accordance with the optimal coasting point,
calculate a total energy consumption across a plurality of eco-coasting performance sections, in which the driver adheres to the eco-coasting guidance while driving along the driving route, based on a current of a battery of the vehicle and a voltage of the battery in each eco-coasting performance section,
sum energy gain rates to calculate a total energy gain rate while driving along the driving route when the driver adheres to the eco-coasting guidance, compared to when the driver does not adhere to the eco-coasting guidance, in each of the eco-coasting performance sections, simultaneously with calculating the total energy consumption, and
calculate the fuel efficiency increasing rate when the driver adheres to the eco-coasting guidance, compared to when the driver does not adhere to the eco-coasting guidance, based on the calculated total energy gain rate; and
an output unit equipped in the vehicle through which the calculated fuel efficiency increasing rate is displayed.

8. The apparatus of claim 7, wherein the output unit is an instrument cluster equipped in the vehicle.

* * * * *